TERNARY SYSTEM
$KHSO_5 - KHSO_4 - K_2SO_4$
(Mole Percent)

○ Stable Compositions
× Unstable Compositions
×— —○ Unstable Compositions Become Stabilized

*INVENTORS*
Alfred A. D'Addieco
Donald B. Lake
BY Stephen E. Stephanou

Amos G. Cole
*AGENT*

ROOM TEMPERATURE STABILITY
OF POTASSIUM MONOPERSULFATE COMPOSITIONS

INVENTORS
Alfred A. D'Addieco
Donald B. Lake
BY Stephen E. Stephanou

Amos J. Cole
AGENT

X-RAY POWDER
DIFFRACTION PATTERN OF
TRIPLE SALT, $KHSO_4 \cdot K_2SO_4 \cdot 2KHSO_5$

X-RAY POWDER
DIFFRACTION PATTERN OF
POTASSIUM MONOPERSULFATE, $KHSO_5$

SOLID PHASE RELATIONS
IN SYSTEM
$KHSO_5 - H_2SO_4 \cdot K_2SO_4 - H_2O$
15°C
(Mole Percent)

SOLID PHASE RELATIONS
IN SYSTEM
KHSO₅ - H₂SO₄ - K₂SO₄ - H₂O
30°C
(Mole Percent)

SOLID PHASE RELATIONS
IN SYSTEM
$KHSO_5 - H_2SO_4 - K_2SO_4 - H_2O$
45°C
(Mole Percent)

*INVENTORS*
Alfred A. D'Addieco
Donald B. Lake
BY Stephen E. Stephanou

AGENT

EFFECT OF TEMPERATURE
ON TRIPLE SALT FIELD
IN SYSTEM
$KHSO_5 - H_2SO_4 - K_2SO_4 - H_2O$
(Mole Percent)

INVENTORS.
Alfred A. D'Addieco
Donald B. Lake
BY Stephen E. Stephanou

AGENT 3,041,139
METHOD OF PREPARING MONOPERSULFATE COMPOSITION CONTAINING THE TRIPLE SALT KHSO$_4$·K$_2$SO$_4$·2KHSO$_5$
Alfred A. D'Addieco, Grand Island, N.Y., Donald B. Lake, Wilmington, Del., and Stephen E. Stephanou, Santa Ana, Calif., assignors to E. I. du Pont de Nemours and Company, Wilmington, Del., a corporation of Delaware
Filed June 24, 1960, Ser. No. 38,602
13 Claims. (Cl. 23—114)

This application is a continuation-in-part of our copending applications Serial No. 549,629, filed November 29, 1955 and Serial No. 707,034, filed January 3, 1958, which applications are now abandoned. Said application Serial No. 707,034 is a continuation-in-part of said application Serial No. 549,629 which in turn is a continuation-in-part of our application Serial No. 525,628, filed August 1, 1955 and now abandoned.

This application relates to monopersulfate compositions and more particularly to potassium monopersulfate compositions, including a new compound which is a triple salt containing potassium monopersulfate, and to their preparation.

Alkali and alkaline earth metal monopersulfates are active oxygen-containing compounds useful for bleaching and other purposes. Potassium monopersulfate can be prepared readily by a reaction involving monopersulfuric acid and the hydroxide, carbonate or bicarbonate of potassium. However, as generally prepared by methods described in published literature, potassium monopersulfate compositions are relatively unstable and hygroscopic.

Active oxygen may be defined as the oxygen in the monopersulfate molecule in excess of that required to form the corresponding bisulfate. It may be calculated as a percentage from the equation for the decomposition of the monopersulfate, $$KHSO_5 \rightarrow KHSO_4 + [O]$$

as follows:

$$\text{Percent A.O.} = \frac{\text{Wt. of [O]}}{\text{Wt. of } KHSO_5} \times 100$$

where A.O. represents the active oxygen and [O] is the oxygen liberated by the decomposition shown. In applying the formula given, the weight of KHSO$_5$ is replaced by the weight of sample where impure material is used. Active oxygen can, of course, be determined from many reactions, the displacement of iodine from potassium iodide, for example, being quantitative. The active oxygen in monopersulfates is available for the production of molecular oxygen or for use in various oxidation reactions.

An object of the invention is to provide improvements in the manufacture of solid potassium monopersulfate compositions.

An important object is to provide new solid potassium monopersulfate compositions and a method for their production, which compositions have desirable properties not possessed by compositions made by prior methods.

A particular object is to provide a new compound which is a triple salt of potassium monopersulfate, potassium bisulfate and potassium sulfate.

A further object is to provide solid potassium monopersulfate compositions containing the above new compound, and a method for their production.

Still further objects will be apparent from the following description.

The products of the invention are the new triple salt compound of the formula KHSO$_4$·K$_2$SO$_4$·2KHSO$_5$, and solid compositions containing said triple salt in admixture with one or more of the single salts KHSO$_5$, KHSO$_4$ and K$_2$SO$_4$ and/or with one or more double salts whose components are two of said single salts, in such proportions as are indicated below. The process of the invention involves forming an aqueous solution having a solute composition as defined hereinafter and recovering a solid product containing said triple salt from the solution.

FIGURE 1 of the accompanying drawings is a ternary diagram in which the area of the closed curve ABCJD represents the solid compositions of the invention.

The compositions of the invention are characterized by having present therein a substantial proportion, i.e., at least 5% and preferably at least 50% by weight, of the triple salt, KHSO$_4$·K$_2$SO$_4$·2KHSO$_5$. The compositions will in general have the over-all chemical compositions, in terms of the single component salts (KHSO$_4$, K$_2$SO$_4$ and KHSO$_5$), represented by the area within the closed curve ABCJD of FIGURE 1. Since those compositions represented by the area within the closed curve AIJD are distinguished from the other compositions of area ABCJD by being much less hygroscopic, they constitute preferred compositions. Of such preferred compositions, those having a triple salt content of at least 50% by weight are most preferred.

The triple salt contents of the compositions of the invention will generally be about equal to the maximum contents which are theoretically possible, based upon the actual contents of the component single salts. Actual triple salt contents can be determined approximately by X-ray diffraction methods.

The compositions of the invention can be prepared from readily accessible materials such as oleum, hydrogen peroxide and potassium hydroxide, carbonate or bicarbonate. Conveniently, oleum containing 53 to 82% dissolved SO$_3$ based upon the total weight of the oleum, is reacted with aqueous hydrogen peroxide containing 35 to 90% H$_2$O$_2$ by weight in the proportion of from 1 to 1.8 moles of oleum (dissolved plus combined SO$_3$) per mole of H$_2$O$_2$ to give a mixture of monopersulfuric and sulfuric acids, which mixture is then reacted with sufficient potassium hydroxide, carbonate or bicarbonate to give a second mixture having a pH of about 1.5–2.5, preferably 2.0–2.5. As is disclosed in Stephanou application Serial No. 476,607, filed December 20, 1954 and issued August 13, 1957 as Patent 2,802,722, the proportioning of the reactants so as to give a mixture having a pH greater than 3 should be avoided, otherwise decomposition with loss of active oxygen becomes excessive.

Figure 1:
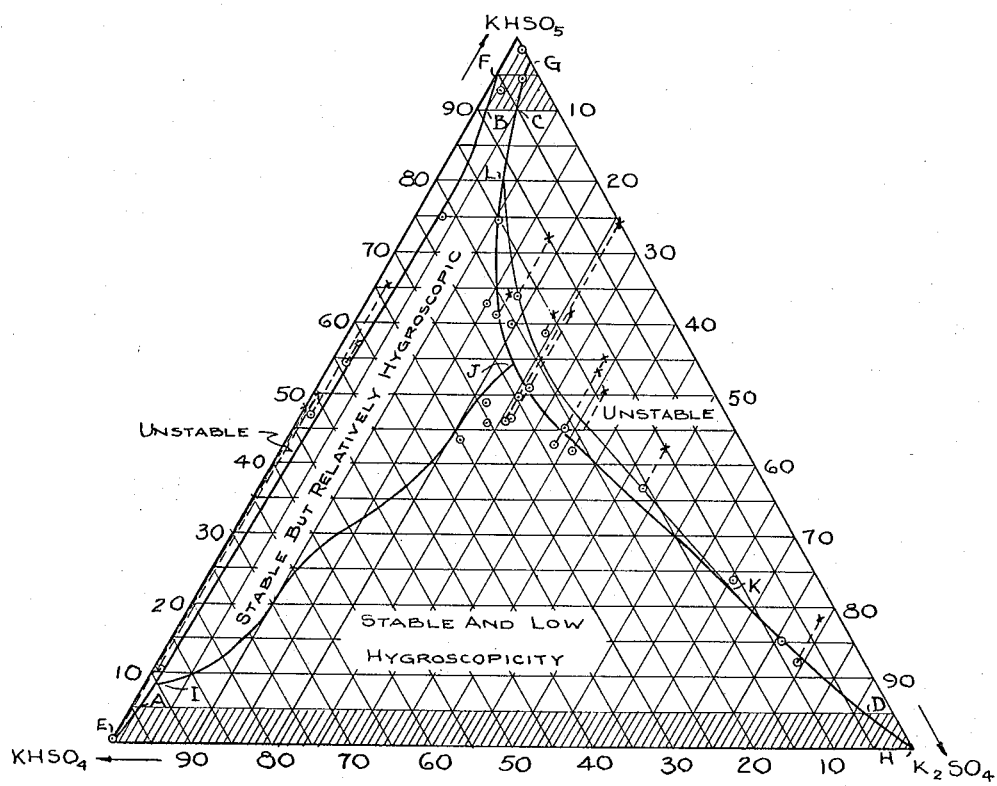

In practicing the invention by reacting a mixture of monopersulfuric and sulfuric acids with potassium hydroxide, carbonate or bicarbonate, the reactants may be so proportioned as to give a reaction mixture having a solute composition (in terms of KHSO$_5$, KHSO$_4$ and K$_2$SO$_4$) represented by a point within the area of the closed curve ABCJD of FIGURE 1, and then recovering product from the mixture, e.g., by evaporating to dryness or by crystallization procedures. The resulting product will be substantially more stable than are the compositions represented by those areas of FIGURE 1 designated as "unstable."

The single salts, $KHSO_5$, $KHSO_4$ and $K_2SO_4$, can themselves be employed by forming aqueous mixtures thereof in proper proportions to give aqueous systems from which the products of the invention can be recovered. Alternatively, either potassium sulfate or bisulfate can be added as a solid or in separate solution during the reaction of monopersulfuric acid and potassium hydroxide or carbonate to form a mixture of the required composition from which the desired product is recovered.

The pure triple salt, $KHSO_4 \cdot K_2SO_4 \cdot 2KHSO_5$, if desired, can be readily obtained by fractional crystallization procedures. The solute compositions of solutions which will give the triple salt upon being concentrated to crystallize a solid product therefrom are readily apparent from FIGURES 5, 6 and 7.

Figure 5:
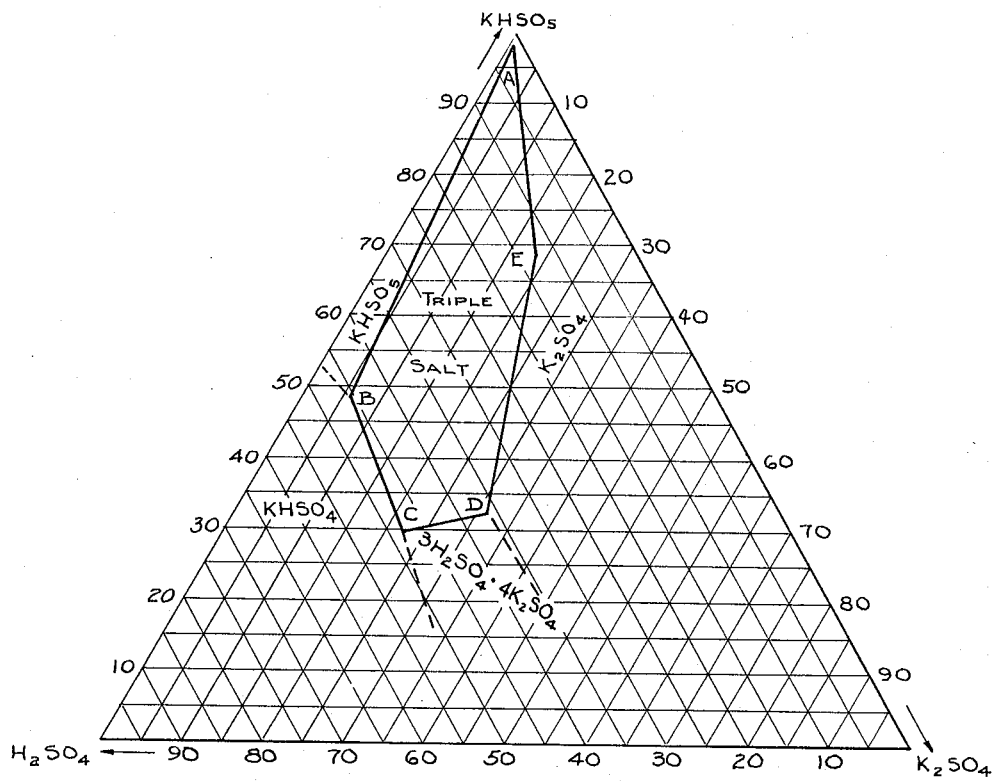
FIGURES 5, 6 and 7 are phase relations diagrams for the system KHSO$_5$—H$_2$SO$_4$—K$_2$SO$_4$—H$_2$O at temperatures of 15° C., 30° C., and 45° C., respectively.
Figure 6:
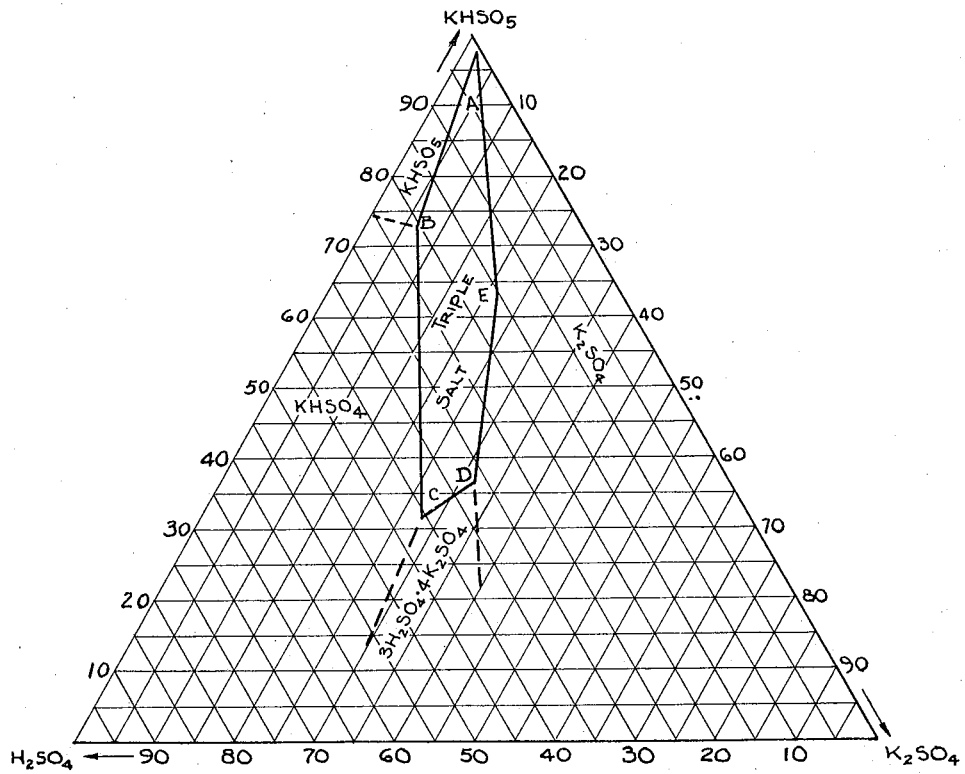
Figure 7:
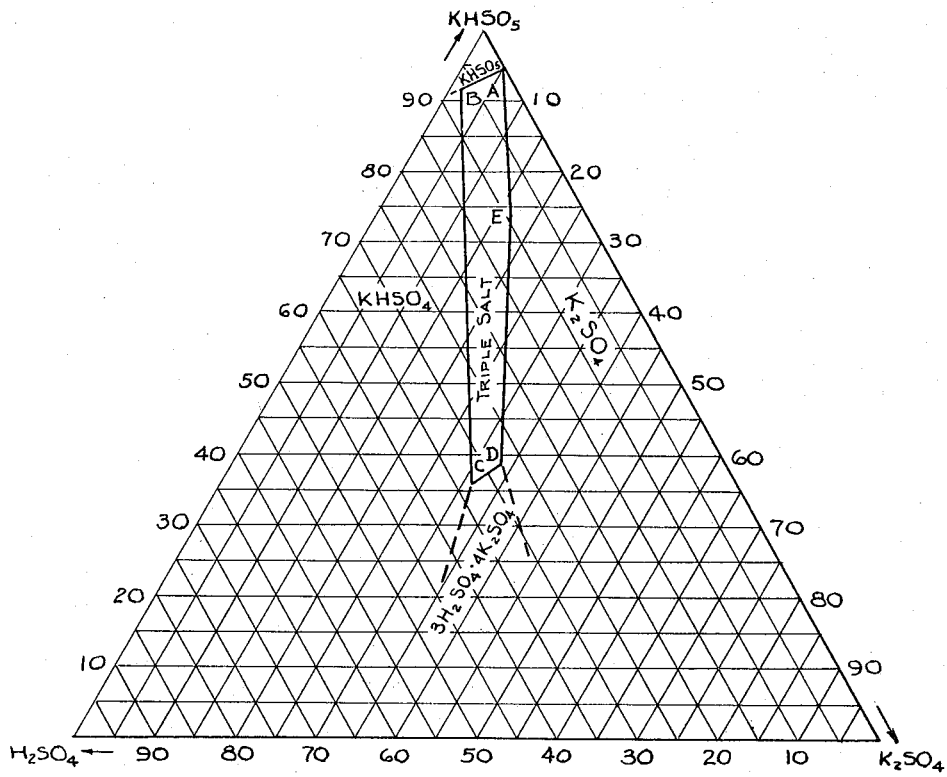

The phase relations at 15° C., 30° C., and 45° C. for the system $KHSO_5$—$H_2SO_4$—$K_2SO_4$—$H_2O$ are shown partially in FIGURES 5, 6 and 7, respectively. Each triangular diagram of these figures represents the base of a right prism in which the height (not indicated) represents the concentration of water. In each figure, the triple salt area or field ABCDE represents the solute compositions of all solutions in equilibrium with solid triple salt. Similarly, the $K_2SO_4$ field represents the solute compositions of solutions in equilibrium with solid $K_2SO_4$ while the boundary between those two fields represents the solute compositions of solutions in equilibrium with both solid triple salt and solid $K_2SO_4$.

Details of the phase relations for the bottom portion and for the left side of the diagrams of FIGURES 5, 6 and 7 have not been completely established. However, as to the bottom portion the indications are that the prevalent solid phases are $KHSO_4$, $K_2SO_4$ and various $H_2SO_4$—$K_2SO_4$ complexes, and that boundary line CD represents the solute compositions of solutions in equilibrium with the triple salt and one such complex, as shown in the figures. Thus, at 30° C. definite indications were obtained that the the complex in equilibrium with the triple salt and solution at boundary CD is $$3H_2SO_4 \cdot 4K_2SO_4$$

this complex is also shown for the sake of simplicity in the other figures. Also, there are strong indications that when solutions with solute compositions of about 50–78% $KHSO_5$, 9–26% $H_2SO_4$ and 12.5–24% $K_2SO_4$ (mole percent) are evaporated to dryness at temperatures under about 60° C. there are obtained solid products containing a complex of $KHSO_5$ and $KHSO_4$, which complex is probably a hydrate of a double salt of the formula $KHSO_4 \cdot 2KHSO_5$. The existence of some such double salt is shown by the fact that some product fractions give an X-ray powder diffraction pattern distinctly different from the patterns for $KHSO_5$, $KHSO_4$, $K_2SO_4$ or the previously mentioned triple salt. Such a double salt has not been isolated in pure form, and its existence has not been indicated on the diagrams of FIGURES 5, 6 and 7. If all details of the upper left side of those diagrams were known, it seems likely that a field for such double salt would occur somewhere in the upper left hand portion of the diagram between the $KHSO_5$ and the triple salt fields.

Figure 2:
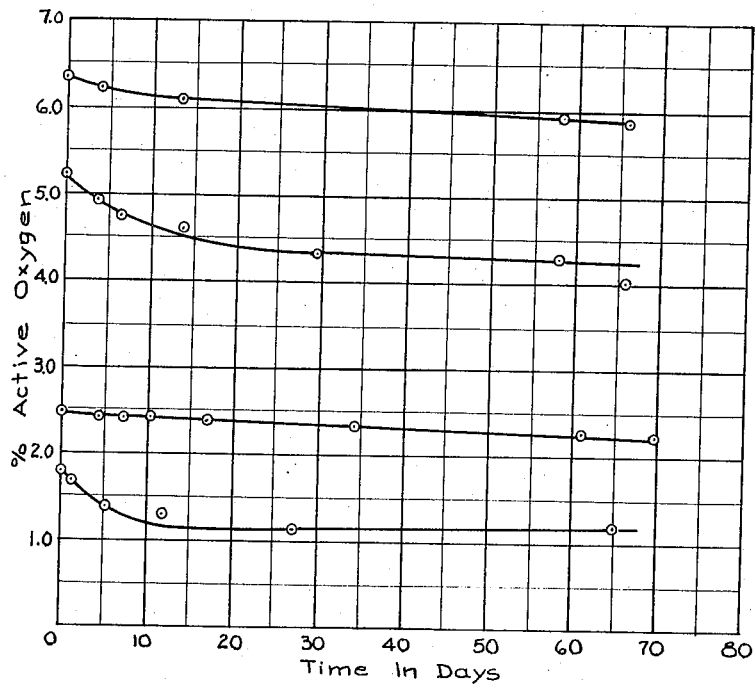
FIGURE 2 is a diagram showing typical decomposition curves for the potassium monopersulfate compositions.

Continued drying at 60–100° C. of a solid product containing the above complex of $KHSO_5$ and $KHSO_4$ converts the complex to another complex of $KHSO_5$ and $KHSO_4$, believed to have the formula $KHSO_5 \cdot 2KHSO_4$. This latter complex also gives a distinctive X-ray powder diffraction pattern. The first of these complexes also converts on standing to the second with loss of active oxygen, and is more hygroscopic than the second. The presence of substantial amounts of the relatively unstable first complex may explain why some products are relatively unstable when first made but become more stable upon standing as indicated by the curves of FIGURE 2. Since the second of the above complexes is relatively thermally stable at 60–100° C. whereas the first is not, drying at temperatures above 60° C., e.g., 60–80° C., or subjecting product dried at a lower temperature to a subsequent heat treatment at such higher temperatures, facilitates obtaining product having a low rate of active oxygen loss under usual storage conditions. Essentially the same result is achieved if product which is relatively unstable due to the presence of the first of the above complexes is permitted to stand or "age" for a time under normal temperature conditions. However, even the above relatively stable second complex (believed to have the formula $KHSO_5 \cdot 2KHSO_4$) in $KHSO_5$—$KHSO_4$—$K_2SO_4$ systems converts on long standing to the more stable triple salt, $KHSO_4 \cdot K_2SO_4 \cdot 2KHSO_5$.

Figure 8:
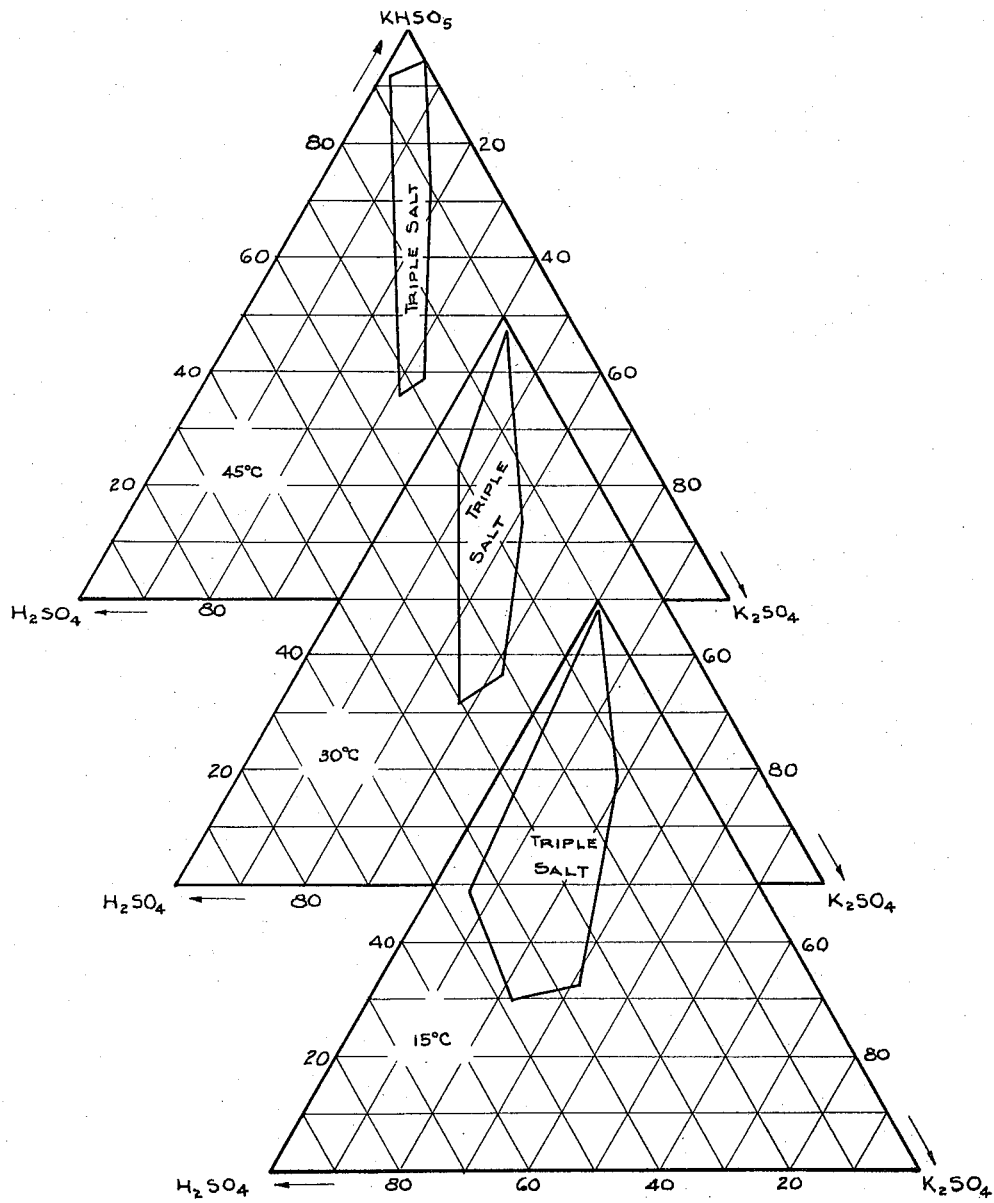
FIGURE 8 is a composite of the diagrams of FIGURES 5, 6 and 7 and shows the effects of temperature on the triple salt field in the above system.

It can be seen from FIGURE 8 that temperature has a relatively minor effect upon the right side, a moderate effect upon the bottom and a fairly pronounced effect upon the left and top sides of the triple salt field. The exact effect upon the top side is somewhat uncertain at the higher temperature because of the difficulty of obtaining accurate analytical data for systems high in $KHSO_5$ at 45° C. due to the high solute concentrations and high viscosities of such systems at that temperature. Some extrapolation and use of analogy with data for lower temperature were therefore necessary to complete the boundaries in the uncertain regions. However, the boundaries of the triple salt field are believed to be substantially as shown in FIGURES 5 through 8.

Ordinarily, phase boundaries are represented by curves. However, the curvatures of the boundary lines for the triple salt field are slight and for practical purposes the boundaries may be represented by straight lines as has been done in FIGURES 5 through 8 which show the triple salt field as an irregular pentagon with corners A, B, C, D and E. This makes it possible to derive equations giving the shape and size of the triple salt field as a function of temperature. By means of these equations, interpolation and moderate extrapolation are possible.

The locus of any one corner, e.g., "A," of the pentagon representing the triple salt field as a function of temperature is given by the equations:

$$X = K_{1XA} + K_{2XA}T + K_{3XA}T^2$$
$$Y = K_{1YA} + K_{2YA}T + K_{3YA}T^2$$
$$Z = 100 - X - Y$$

where X, Y and Z, respectively, are concentrations of $KHSO_5$, $H_2SO_4$ and $K_2SO_4$ in mole percent, T is temperature (°C.) and all K's are constants. Thus, the positions of the five corners of the pentagon representing the triple salt field can be calculated for a given temperature from the following independent equations in which the numerical values worked out for the constants have been inserted:

| Corner | |
|---|---|
| A | $X = 97.62 + 0.1433\,T - 0.00493\,T^2$ |
|   | $Y = 1.37 - 0.0190\,T - 0.00002\,T^2$ |
| B | $X = 17.10 + 2.279\,T - 0.01373\,T^2$ |
|   | $Y = 83.62 - 2.2919\,T - 0.02702\,T^2$ |
| C | $X = 31.08 - 0.1907\,T + 0.006627\,T^2$ |
|   | $Y = 54.42 - 0.3937\,T - 0.00184\,T^2$ |
| D | $X = 25.91 + 0.4697\,T - 0.00402\,T^2$ |
|   | $Y = 42.01 - 0.3930\,T + 0.00180\,T^2$ |
| E | $X = 89.30 - 1.894\,T + 0.03447\,T^2$ |
|   | $Y = 2.54 + 0.9647\,T - 0.01813\,T^2$ |

The above five independent equations which define the triple salt field for a given temperature are hereinafter referred to for the sake of brevity simply as "the five triple salt field equations."

Coordinates for the corners of the triple salt field, calculated by means of the five triple salt field equations, for temperatures ranging from 10° C. to 45° C. in intervals of 5° C. are given in Table I.

TABLE I

Corners for Triple Salt Field

[Temperatures in ° C.—Compositions in Mole Percent]

| Temperature | $KHSO_5$ | $H_2SO_4$ | $K_2SO_4$ | Corner |
|---|---|---|---|---|
| 10 | 98.56 | 1.18 | .25 | A |
|  | 38.51 | 57.13 | 4.34 | B |
|  | 29.84 | 50.30 | 19.85 | C |
|  | 30.20 | 38.26 | 31.52 | D |
|  | 73.81 | 10.37 | 15.80 | E |
| 15 | 98.66 | 1.08 | .24 | A |
|  | 48.19 | 45.91 | 5.89 | B |
|  | 29.71 | 48.10 | 22.17 | C |
|  | 32.05 | 36.52 | 31.41 | D |
|  | 68.65 | 12.93 | 18.40 | E |
| 20 | 98.51 | .98 | .49 | A |
|  | 57.18 | 36.04 | 6.76 | B |
|  | 29.92 | 45.81 | 24.26 | C |
|  | 33.69 | 34.87 | 31.42 | D |
|  | 65.21 | 14.58 | 20.19 | E |
| 25 | 98.12 | .88 | .98 | A |
|  | 65.48 | 27.53 | 6.98 | B |
|  | 30.45 | 43.43 | 26.11 | C |
|  | 35.14 | 33.31 | 31.54 | D |
|  | 63.50 | 15.32 | 21.16 | E |
| 30 | 97.48 | .78 | 1.72 | A |
|  | 73.10 | 20.36 | 6.53 | B |
|  | 31.32 | 40.95 | 27.71 | C |
|  | 36.38 | 31.84 | 31.76 | D |
|  | 63.51 | 15.16 | 21.32 | E |
| 35 | 96.59 | .68 | 2.71 | A |
|  | 80.03 | 14.55 | 5.41 | B |
|  | 32.52 | 38.38 | 29.08 | C |
|  | 37.42 | 30.46 | 32.10 | D |
|  | 65.24 | 14.09 | 20.65 | E |
| 40 | 95.46 | .57 | 3.95 | A |
|  | 86.27 | 10.08 | 3.63 | B |
|  | 34.05 | 35.72 | 30.21 | C |
|  | 38.26 | 29.17 | 32.55 | D |
|  | 68.70 | 12.11 | 19.17 | E |
| 45 | 94.08 | .47 | 5.43 | A |
|  | 91.83 | 6.97 | 1.18 | B |
|  | 35.91 | 32.97 | 31.10 | C |
|  | 38.90 | 27.97 | 33.11 | D |
|  | 73.88 | 9.23 | 16.88 | E |

Any solution whose solute composition lies within the triple salt field of FIGURES 5 to 7 will, upon evaporation, yield solid triple salt. Recovery of pure triple salt usually will not be required although solid products containing at least 50% and most preferably at least 80% by weight of the triple salt are definitely advantageous. It is generally preferred to effect crystallization of triple salt product by a continuous operation in which the aqueous phase from which the crystallization is effected has a solute composition corresponding to component values of from 50–78% $KHSO_5$, 9–26% $H_2SO_4$ and 12.5–24% $K_2SO_4$ (mole percent). The component values should, of course, be chosen from within the above ranges so that the solute composition will be within the triple salt field of the phase relations diagram for the temperature at which crystallization is effected.

Thus, when using aqueous potassium hydroxide (e.g., of about 45% KOH by weight) and a mixture of monopersulfuric and sulfuric acids (containing about 59.1% $H_2SO_5$, 31.8% $H_2SO_4$, 1.8% $H_2O_2$ and 7.3% $H_2O$ by weight) as reactants, continuous streams thereof are conveniently separately added to and mixed with a stream of reaction slurry which is continuously circulated from a vacuum evaporator (operated at about 25–35° C. and 20–30 mm. Hg absolute pressure) through a steam-heated calandria and back to the evaporator. A product slurry stream is continuously removed from the recirculation system, centrifuged, and the mother liquor returned to the recirculation system. When the reactant streams fed to the system are proportioned so as to maintain the solute composition of the liquid phase of the system at about 74% $KHSO_5$, 12% $H_2SO_4$ and 14% $K_2SO_4$ (mole percent) and the wet centrifuge cake is dried in a rotary drier with a countercurrent stream of hot air (60–80° C.), there is obtained a dry product having an over-all composition corresponding to about 50% $KHSO_5$, 25% $KHSO_4$ and 25% $K_2SO_4$ (mole percent). The product will contain about 95% or more by weight of the triple salt, $KHSO_4 \cdot K_2SO_4 \cdot 2KHSO_5$, with perhaps small amounts of $KHSO_5$, $KHSO_4$, $K_2SO_4$ and/or various complexes or solid solutions of pairs of the single salts such as the $KHSO_5$—$KHSO_4$ complexes mentioned previously.

Commercial products should exhibit a low rate of active oxygen loss under normal handling and storage conditions. Such rate of active oxygen loss should generally be less than 2%, and preferably will be less than 1%, per month at room temperature (25° C.). The terms "stable products" and "stable compositions" are used herein to mean products and compositions which lose active oxygen at a rate not exceeding 2% per month at room temperature. The rate of active oxygen loss can be determined from the results of analyzing a given product sample at the beginning and end of a one-month storage period at room temperature and this method of testing is referred to as the "storage stability test."

Manometric determinations of the oxygen evolved through loss of active oxygen in short periods of time at a constant temperature of 25° C. can be used to determine what may be termed "instantaneous" rates of loss of active oxygen. When using this "instantaneous stability test," it is convenient for comparison purposes to calculate the results in terms of the percent of original active oxygen that would be lost in one month at 25° C.

Another convenient test involves heating a dry test sample at 50° C. until its rate of evolving oxygen through loss of active oxygen becomes substantially constant, as shown by measuring manometrically the oxygen evolved, and determining the amount of active oxygen still present in the sample when a constant rate of evolution has been reached. This "accelerated dry stability test" provides a simple and rapid way of determining how much active oxygen can be expected to be lost before a stable product will be obtained. Experience has shown that when the rate of loss of active oxygen becomes constant under the conditions of the test, the sample will generally have reached a stable state where its rate of loss of active oxygen as determined either by the above "storage stability test" or the "instantaneous stability test" will not exceed 2%, and generally will not exceed 1%, per month at 25° C. Naturally, a product which loses a high proportion of its active oxygen before reaching a stable state is less desirable than one which initially is stable or loses only a small proportion of its active oxygen before arriving at a stable state.

Referring to FIGURE 1, the product compositions represented by the area within the closed curve ABCJD are generally stable in accordance with the above definition. However, as has been indicated previously, when product is recovered by crystallization followed by drying of the crystals wet with mother liquor, there may be obtained products which initially are relatively unstable but become stable upon aging or upon being heated. Such initial instability appears to be due largely to the coating of the crystals with material containing a relatively unstable complex such as $2KHSO_5 \cdot KHSO_4$ formed as the mother liquor wetting the crystals dries.

In general, compositions within the area of the closed curve ABCJD of FIGURE 1 are decidedly more stable than are the compositions of the other areas designated as "unstable." Furthermore, of the compositions represented by area ABCJD, those of the more restricted area AIJD are generally the more stable, probably because they are distinctly less hygroscopic. Line IJ represents approximately the 7% hygroscopicity curve. Numerous tests have established that, in general, compositions of the diagram below that line have hygroscopicities less than 7% while those above have hygroscopicities greater than 7%. Furthermore, hygroscopicity increases quite abruptly as the compositions move up from line IJ.

The hygroscopicity values reported herein represent the percent increase in weight of a sample resulting from the constant exposure of the initially dry sample at 25° C. to air at 80% relative humidity until no further gain in weight occurs. A few representative hygroscopicity values among the many that have been determined for products of a wide range of compositions are shown in Table II.

TABLE II

Hygroscopicity vs. Product Composition

| Composition, mole percent | | | Hygroscopicity, percent gain in weight at 25° C., 80% R.H. |
|---|---|---|---|
| $KHSO_5$ | $KHSO_4$ | $K_2SO_4$ | |
| 60.0 | 24.9 | 15.1 | 16.2 |
| 58.7 | 26.0 | 15.3 | 17.3 |
| 50.0 | 34.2 | 15.8 | 17.2 |
| 64.6 | 29.7 | 5.7 | >36 |
| 16.3 | 78.4 | 5.3 | 9.4 |
| 40.7 | 53.8 | 5.5 | >36 |
| 51.2 | 24.5 | 24.3 | 1.6 |
| 17.5 | 72.1 | 10.4 | 5.0 |
| 37.6 | 43.3 | 19.1 | 6.7 |
| 40.5 | 34.2 | 25.3 | 0.2 |
| 44.8 | 26.8 | 28.4 | 0 |

All of the above compositions are within area ABCJD of FIGURE 1. All with hygroscopicities less than 7%, i.e. the last 5, fall below the 7% hygroscopicity curve IJ, while all with hygroscopicities greater than 7% (the first 6) fall above curve IJ.

Probably the best known prior method of preparing a potassium monopersulfate product is that of Price, Journal of the Chemical Society (Trans.) 89, part I (1906), pages 53–8, which appears to be essentially the same as the method described in Mellor, "Comprehensive Treatise on Inorganic and Theoretical Chemistry," vol. 10 (1930), pages 482–3. Price's method involves adding potassium carbonate to a mixture of monopersulfuric and sulfuric acids and their potassium salts until effervescence ceases, separating the precipitated $K_2SO_4$, concentrating the resulting neutral solution by evaporation in a vacuum over concentrated $H_2SO_4$ during a 1–2 week period while periodically filtering off the $K_2SO_4$ which separates continuously, and then allowing the evaporation to go to dryness. Price reported that his products contained $KHSO_5$, $KHSO_4$, $K_2S_2O_8$ and $K_2SO_4$ and gave analytical data for their compositions. It is clearly evident from those data that his products were quite different in composition from the present products. Furthermore, we have found that products similar in composition to those of Price are substantially less stable than are those of area ABCJD and they are substantially more hygroscopic than are products of compositions represented by area AIJD of FIGURE 1.

Products having over-all compositions approximating those reported by Price were prepared by dissolving $KHSO_5$, $KHSO_4$ and $K_2SO_4$ in water to give concentrated solutions having solute compositions approximating the over-all compositions of the desired final dry products, then freeze-drying the solutions, then further drying the solid product over a desiccant to constant weight. Active oxygen losses were slight so that the proportions of $KHSO_5$, $KHSO_4$ and $K_2SO_4$ in the final products were essentially the same as in the starting solutions. Some of the products were subjected to the above hygroscopicity test, while the remaining were subjected to the instantaneous stability test. The results were as follows:

TABLE III

Properties of Price-Type Compositions

| Product | $KHSO_5$ | $KHSO_4$ | $K_2SO_4$ | Hygroscopicity, percent | Active oxygen loss/month percent [1] | |
|---|---|---|---|---|---|---|
| | | | | | Initially | After heating [2] |
| A | 57.8 | 6.5 | 35.7 | 13.2 | | |
| B | 69.6 | 7.1 | 23.3 | 14.3 | | |
| C | 61.4 | 10.1 | 28.5 | | 28 | 26 |
| D | 66.9 | 12.0 | 21.1 | | 26 | 12 |

[1] Determined by instantaneous stability test at 32° C. (instead of 25° C.)
[2] Determined after the sample had been heated for 20 hours at 65° C The invention is illustrated further by the following examples in which all percentages are by weight unless indicated otherwise.

EXAMPLE 1

This example shows the preparation of an unstable monopersulfate composition.

(A) An acid solution containing 61% $H_2SO_5$ and 23% $H_2SO_4$ was partially neutralized with 50% potassium carbonate solution. The resulting slurry was tray-dried in a forced-draft oven at 50–60° C. and the product analyzed. The product, which initially contained 5.46% active oxygen, analyzed 51.8% $KHSO_5$, 11.0% $KHSO_4$ and 37.2% $K_2SO_4$. The mole ratio $KHSO_5:KHSO_4:K_2SO_4$ was 4.2:1:2.6. The composition in mole percentages based on the three component salts was 53.8% $KHSO_5$, 12.8% $KHSO_4$ and 33.3% $K_2SO_4$ which is outside the area of the closed curve ABCJD of FIGURE 1.

The dried mixture was allowed to stand at room temperature (about 25° C.) in a vented bottle for several weeks and analyses were repeated at intervals. The active oxygen fell during the first day to 5.1%, a loss of around 6.6%. The active oxygen loss in a three-week period was about 20%. By the end of three weeks, the loss of active oxygen was very slow and the rate remained practically constant.

(B) An equilibrium mixture, 200 grams, containing 59.3% $H_2SO_5$ (1.04 moles) and 27.4% $H_2SO_4$ (0.559 moles) was neutralized with 50% aqueous potassium carbonate nearly completely to $KHSO_5$ and $K_2SO_4$. The slurry was lyophilized by freezing and dehydrating the frozen material under a vacuum of about 0.1–0.3 mm. of mercury. The dry product contained 52.7% $KHSO_5$ (5.55% active oxygen), 6.5% $KHSO_4$, 39.3% $K_2SO_4$ and 1.5% moisture. The mole ratio $KHSO_5:KHSO_4:K_2SO_4$ was 7.26:1:4.73. The composition in mole percentages, based on the three component salts, was 55.9% $KHSO_5$, 7.7% $KHSO_4$ and 36.4% $K_2SO_4$ which is outside the area of the closed curve ABCJD of FIGURE 1.

When tested by the accelerated dry stability test, the lyophilized product of this example showed an active oxygen loss of 28% before the rate of active oxygen loss became constant.

EXAMPLE 2

This example shows the preparation of a stable monopersulfate composition.

In a reaction vessel equipped with a mechanical stirrer was placed 200 g. of a mixture of $H_2SO_5$ and $H_2SO_4$ containing 63.3% $H_2SO_5$ (1.11 moles) and 20.2% $H_2SO_4$ (0.412 mole). To the stirred acid mixture maintained at 5–10° C. by external cooling was added slowly 267.4 g. of 50% aqueous $K_2CO_3$ (0.967 mole).

The resultant slurry was then tray-dried in a forced-draft oven at 50–60° C. for 4 hours. Analysis of the product immediately after drying was as follows: 50.8% $KHSO_5$ (5.32% active oxygen), 21.2% $KHSO_4$, 27.7% $K_2SO_4$ and 0.3% moisture. The mole ratio $KHSO_5:KHSO_4:K_2SO_4$ was 2.14:1:1.02. The composition in mole percentages, based on the three component salts, was 51.5% $KHSO_5$, 24.0% $KHSO_4$ and 24.5% $K_2SO_4$ which is within the area of the closed curve ABCJD of FIGURE 1.

The product was tested by the accelerated dry stability test. Results showed there was an initial loss of oxygen corresponding to 1% per month, probably while some moisture was still present in the sample. The loss rate rapidly fell to less than 1% per month and then remained constant.

EXAMPLE 3

This example shows the preparation of a preferred composition of the invention.

An attempt was made to prepare a composition having a theoretical $KHSO_5:KHSO_4:K_2SO_4$ mole ratio of 2:1:1 by adding together the required amounts of the solids in water and freeze-drying the slurry. The product obtained had an actual mole ratio of 1.95:1:0.96, and contained 5.22% active oxygen.

The accelerated dry stability test applied to the sample prepared as described showed that the active oxygen loss immediately obtained was less than 1% per month.

EXAMPLE 4

This example shows the preparation of monopersulfate mixtures from substantially pure potassium monopersulfate.

A. Potassium monopersulfate was prepared by reacting a mixture of monopersulfuric acid and sulfuric acid containing 63% by weight $H_2SO_5$ and about 20% $H_2SO_4$ with an amount of 50% aqueous potassium carbonate equivalent to the monopersulfuric acid present. The precipitate was collected on a sintered glass funnel by vacuum filtration and washed with several portions of cold absolute ethanol. After drying in a vacuum desiccator, the crude product contained the equivalent of 88.4% $KHSO_5$ (9.31% active oxygen), 9.6% $KHSO_4$ and 2.0% $K_2SO_4$ and represented an active oxygen yield of 41.5%.

Pure potassium monopersulfate was obtained from the above crude product by each of the following fractional crystallization procedures:

(1) The crude product was dissolved in a minimum amount of water and the solution was cooled until some crystallization occurred. After separating the crystals, the mother liquor was cooled further and more crystals were collected. This procedure was repeated until a crystal fraction of substantially pure potassium monopersulfate was obtained.

(2) The crude product was dissolved in a minimum amount of water and absolute ethanol was added until the solution became faintly turbid. The mixture was cooled and the crystals which formed were separated. To the mother liquor was added more ethanol and the procedure was repeated until a crystal fraction of substantially pure potassium monopersulfate was obtained.

The crystalline products from the above procedures were found to contain 10.44% of active oxygen, within 0.1% of the theoretical value for $KHSO_5$. This pure product crystallizes as water-white platelets melting at 100° C. with decomposition. It does not ignite when heated rapidly to high temperature nor detonate when subjected to the Bureau of Mines impact test. The dry material is hygroscopic. So far as known, no monopersulfate product has heretofore been reported with such a high active oxygen content.

B. Monopersulfate compositions were made up in solution from the purified material of (A) by mixing therein varying proportions of potassium bisulfate and potassium sulfate. The resulting solutions were evaporated to dryness and the dried compositions were allowed to stand at room temperature and tested at intervals for active oxygen content. Typical decomposition curves are shown in FIGURE 2. The curves, going from top to bottom of FIGURE 2, are the decomposition curves for samples 10, 22, 25 and 24, respectively of Table IV below.

Stability and other pertinent data for a number of product samples are given in Table IV.

TABLE IV

*Storage Stability (Room Temperature) vs. Product Composition*

| No. | Immediately after sample preparation | | | | | | At stabilization | | | | | |
|---|---|---|---|---|---|---|---|---|---|---|---|---|
| | Weight percent | | | Mole percent | | | Weight percent | | | Mole percent | | |
| | $KHSO_5$ | $KHSO_4$ | $K_2SO_4$ | $KHSO_5$ | $KHSO_4$ | $K_2SO_4$ | $KHSO_5$ | $KHSO_4$ | $K_2SO_4$ | $KHSO_5$ | $KHSO_4$ | $K_2SO_4$ |
| 1 | 98.4 | 00.0 | 1.6 | 98.6 | 0.0 | 1.4 | 98.4 | 0.0 | 1.6 | 98.6 | 0.0 | 1.4 |
| 2 | 95.9 | 00.2 | 3.9 | 94.3 | 2.3 | 3.4 | 95.9 | 0.2 | 3.9 | 94.3 | 2.3 | 3.4 |
| 3 | 93.1 | 5.3 | 1.6 | 92.7 | 5.9 | 1.4 | 93.1 | 5.3 | 1.6 | 92.7 | 5.9 | 1.4 |
| 4 | 76.2 | 19.9 | 3.9 | 74.9 | 21.8 | 3.3 | 76.2 | 19.9 | 3.9 | 74.9 | 21.8 | 3.3 |
| 5 | 74.5 | 13.7 | 11.8 | 74.4 | 15.3 | 10.3 | 74.5 | 13.7 | 11.8 | 74.4 | 15.3 | 10.3 |
| 6 | 70.9 | 8.6 | 20.5 | 72.0 | 9.8 | 18.2 | 63.6 | 15.9 | 20.5 | 63.7 | 18.1 | 18.2 |
| 7 | 62.2 | 19.6 | 17.0 | 62.8 | 22.1 | 15.1 | 62.2 | 19.6 | 17.0 | 62.8 | 22.1 | 15.1 |
| 8 | 64.3 | 16.4 | 19.3 | 64.8 | 18.1 | 17.1 | 60.8 | 19.9 | 19.3 | 61.0 | 22.1 | 17.1 |
| 9 | 59.4 | 18.2 | 22.4 | 59.8 | 20.5 | 19.7 | 59.4 | 18.2 | 22.4 | 59.8 | 20.5 | 19.7 |
| 10 | 60.2 | 12.6 | 27.2 | 61.3 | 14.4 | 24.3 | 57.4 | 15.4 | 27.2 | 58.3 | 17.4 | 24.3 |
| 11 | 60.1 | 37.8 | 2.1 | 57.7 | 40.6 | 1.7 | 56.5 | 41.4 | 2.1 | 54.1 | 44.2 | 1.7 |
| 12 | 60.4 | 9.7 | 29.9 | 62.0 | 11.4 | 26.6 | 50.2 | 19.9 | 29.9 | 50.9 | 22.5 | 26.6 |
| 13 | | | | | | | 49.6 | 22.2 | 28.2 | 43.4 | 35.1 | 21.5 |
| 14 | 67.7 | 30.8 | 1.5 | 65.5 | 33.3 | 1.2 | 49.4 | 49.1 | 1.5 | 46.8 | 52.0 | 1.2 |
| 15 | 48.9 | 22.0 | 29.1 | 49.4 | 24.9 | 25.7 | 48.9 | 22.0 | 29.1 | 49.4 | 24.9 | 25.7 |
| 16 | 48.6 | 26.3 | 25.1 | 48.6 | 29.4 | 22.0 | 48.6 | 26.3 | 25.1 | 48.6 | 29.4 | 22.0 |
| 17 | 52.0 | 18.3 | 29.7 | 52.9 | 20.9 | 26.2 | 46.0 | 24.3 | 29.7 | 46.4 | 27.4 | 26.2 |
| 18 | 70.6 | 0.0 | 29.4 | 74.1 | 0.0 | 25.9 | 45.9 | 24.7 | 29.4 | 46.1 | 28.0 | 25.9 |
| 19 | 45.8 | 27.2 | 27.0 | 45.8 | 30.5 | 23.7 | 45.8 | 27.2 | 27.0 | 45.8 | 30.5 | 23.7 |
| 20 | 53.2 | 9.6 | 37.2 | 55.1 | 11.5 | 33.4 | 44.0 | 18.8 | 37.2 | 45.1 | 21.5 | 33.4 |
| 21 | 52.0 | 10.8 | 37.2 | 53.9 | 12.8 | 33.3 | 41.7 | 21.1 | 37.2 | 42.7 | 24.0 | 33.3 |
| 22 | 48.9 | 11.3 | 39.8 | 50.8 | 13.1 | 36.1 | 40.9 | 18.3 | 39.8 | 42.0 | 21.9 | 36.1 |
| 23 | 39.9 | 8.6 | 51.5 | 42.3 | 10.1 | 47.6 | 34.7 | 13.8 | 51.5 | 36.4 | 16.0 | 47.6 |
| 24 | 16.6 | 1.8 | 81.6 | 18.4 | 2.2 | 79.5 | 10.9 | 7.5 | 81.6 | 12.0 | 8.5 | 79.5 |
| 25 | 21.8 | 9.1 | 69.1 | 23.5 | 11.0 | 65.5 | 21.8 | 9.1 | 69.1 | 23.5 | 11.0 | 65.5 |
| 26 | 13.6 | 7.3 | 79.1 | 15.0 | 9.0 | 76.0 | 13.6 | 7.3 | 79.1 | 15.0 | 9.0 | 76.0 |
| 27 | 52.6 | 46.4 | 1.0 | 49.8 | 49.3 | 0.9 | 11.4 | 87.6 | 1.0 | 10.3 | 88.9 | 0.8 |
| 28 | 50.6 | 49.4 | 0.0 | 47.8 | 52.2 | 0.0 | 0.7 | 99.3 | 0.0 | 0.5 | 99.5 | 0.0 |

The compositions of the samples of Table IV are plotted in FIGURE 1 in terms of the equivalent contents of the three component salts $KHSO_5$, $KHSO_4$ and $K_2SO_4$. In FIGURE 1, lines EAIBF and GCJDH represent the general boundaries between areas of stable and unstable compositions. Pure potassium monopersulfate, $KHSO_5$ is stable, as indicated in the figure. The products whose

TABLE V

*Comparison of Physical Properties of the Salts*

| | KHSO₅ | KHSO₄ | K₂SO₄ | KHSO₄·K₂SO₄·2KHSO₅ |
|---|---|---|---|---|
| Crystal system | | Orthorhombic | Orthorhombic | Orthorhombic. |
| Unit cell dimensions (Angstroms) | | | a. 5.771 | a. 8.60. |
| | | | b. 10.06 | b. 10.53. |
| | | | c. 7.518 | c. 18.82. |
| a:b:c | | 0.8609:1:1.934 | 0.5727:1:0.7418 | 0.817:1:1.787. |
| Molecules/unit cell | | | 4 | 4 (of the triple salt). |
| Crystal density, gms./ml | 1.81 | 2.662 | 2.322 | 2.313. |
| Hygroscopic (Yes or No) | Yes | Yes | No | No. |
| Stability, percent active oxygen loss/month at 32° C | <1% | | | <1% |
| Solubility at 0° C., gms./100 gms. H₂O | 40 | 36.6 | 6.85 | 27. | compositions are represented by the area of the closed curve ABCJD are also stable and have the distinct advantage over pure potassium monopersulfate of being more readily and economically obtainable by commercially feasible methods. Products containing less than the equivalent of 5 mole percent KHSO₅, represented by the area below line AD, are generally too low in active oxygen to be of commercial interest. Thus, the area within the closed curve ABCJD represents the improved solid stable compositions of the invention, including the new triple salt, while the area within the closed curve AIJD represents the preferred compositions.

The relatively small area of the closed curve LJK of FIGURE 1 represents compositions which are either (1) stable or (2) become stable upon aging or heating. Stabilization upon aging or heating generally results in a shift of the over-all product composition so as to bring it within area ABCJD. Accordingly, compositions within the area LJK may be regarded as equivalents of the compositions of area ABCJD.

The following example shows preparation of the pure triple salt by direct precipitation from a reaction mixture.

EXAMPLE 5

A concentrated reaction solution having a solute composition corresponding to 51 mole percent KHSO₅, 23 mole percent K₂SO₄ and 26 mole percent H₂SO₄ was crystallized slowly at 0° C. The crystals which formed were found by analyses to correspond to the formula $$KHSO_4 \cdot K_2SO_4 \cdot 2KHSO_5$$

They gave an X-ray powder diffraction pattern which is distinctly different from the pattern for pure potassium monopersulfate. Unit cell measurements on a single crystal of this triple salt gave crystallographic data distinctly different from those for potassium bisulfate and potassium sulfate. A comparison of the physical properties of the triple salt with those of the single component salts is given in Table V.

Figure 3:
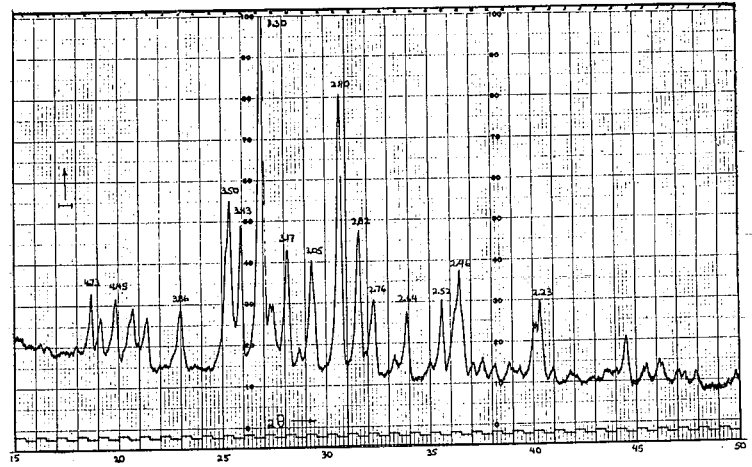
FIGURE 3 is a reproduction of the X-ray powder diffraction pattern of the new triple salt compound.

The present triple salt has an X-ray powder diffraction pattern which is distinctly different from those for KHSO₅, KHSO₄ and K₂SO₄. FIGURE 3 is a reproduction of its X-ray powder diffraction pattern obtained by means of a Norelco X-Ray Diffraction Unit using CuK_α radiation and employing standard techniques. In FIGURE 3, the ordinates "I" represent peak heights and the abscissas "2θ" represent the positions of the peaks, where θ is the Bragg angle. The X-ray powder diffraction pattern of pure potassium monopersulfate, KHSO₅, was similarly determined and is reproduced in FIGURE 4.

Figure 4:
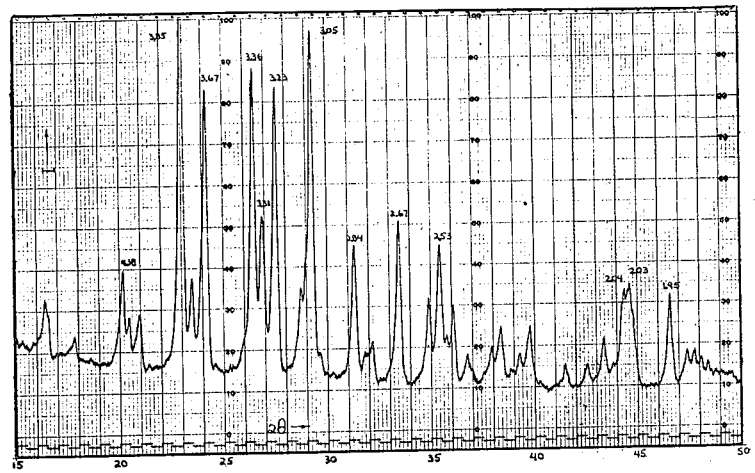
FIGURE 4 is a reproduction of the X-ray powder diffraction pattern of pure potassium monopersulfate, KHSO$_5$.

The "d" values, in Angstroms, of the major peaks of the diffraction patterns of FIGURES 3 and 4 are given in Table VI.

TABLE VI

*"d" Values in Angstroms, of Major Peaks of Diffraction Patterns of FIGURES 3 and 4*

| Figure 3 KHSO₄·K₂SO₄·2KHSO₅ | Figure 4 KHSO₅ |
|---|---|
| 4.73 | 4.38 |
| 4.45 | 3.85 |
| 3.86 | 3.67 |
| 3.50 | 3.36 |
| 3.42 | 3.31 |
| 3.30 | 3.23 |
| 3.17 | 3.05 |
| 3.05 | 2.84 |
| 2.90 | 2.67 |
| 2.82 | 2.53 |
| 2.76 | 2.04 |
| 2.64 | 2.03 |
| 2.52 | |
| 2.46 | |
| 2.23 | |

The triple salt compound whose X-ray powder diffraction pattern is shown in FIGURE 3 generally contains a small amount, about 0.6–0.7% by weight, of water. This water, which is tenaciously retained, corresponds roughly to one molecule per unit cell (4 molecules) of the triple salt. If it is present as water of hydration, which seems likely, the compound formula may be represented as $(KHSO_4 \cdot K_2SO_4 \cdot 2KHSO_5)_4 \cdot H_2O$ for which the calculated water content is 0.73%. However, if the triple salt is crystallized from aqueous solution at low temperatures, e.g. 0–10° C., it does so as a higher hydrate having an X-ray powder diffraction pattern different from that of FIGURE 3. This higher hydrate loses water of hydration readily at room temperature or on washing with methanol to yield the compound whose X-ray powder diffraction pattern is that of FIGURE 3.

It is clear from a comparison of the diffraction patterns of FIGURES 3 and 4, from the "d" values of Table VI, and from the properties of Table V that the triple salt is a new and distinct chemical compound. It is stable in the solid state, is non-hygroscopic and is useful as an oxidizing agent, e.g. for bleaching various materials. Other solid products, represented by the area within closed curve ABCJD of FIGURE 1, which products contain substantial amounts of the triple salt are also stable and similarly useful.

The embodiments of the invention in which an exclusive property or privilege is claimed are defined as follows:

1. The triple salt compound, $KHSO_4 \cdot K_2SO_4 \cdot 2KHSO_5$.

2. A solid composition containing 5 to about 95% by weight of the triple salt compound, $$KHSO_4 \cdot K_2SO_4 \cdot 2KHSO_5$$

and having, in terms of $KHSO_4$, $K_2SO_4$ and $KHSO_5$, an over-all composition represented by a point within the closed curve ABCJD of FIGURE 1.

3. A solid composition containing 50 to about 95% by weight of the triple salt compound, $$KHSO_4 \cdot K_2SO_4 \cdot 2KHSO_5$$

and having, in terms of $KHSO_4$, $K_2SO_4$ and $KHSO_5$, an over-all composition represented by a point within the closed curve ABCJD of FIGURE 1.

4. A solid composition containing 5 to about 95% by weight of the triple salt compound, $$KHSO_4 \cdot K_2SO_4 \cdot 2KHSO_5$$

and having, in terms of $KHSO_4$, $K_2SO_4$ and $KHSO_5$, an over-all composition represented by a point within the closed curve AIJD of FIGURE 1.

5. A solid composition containing 50 to about 95% by weight of the triple salt compound, $$KHSO_4 \cdot K_2SO_4 \cdot 2KHSO_5$$

and having, in terms of $KHSO_4$, $K_2SO_4$ and $KHSO_5$, an over-all composition represented by a point within the closed curve AIJD of FIGURE 1.

6. A solid composition containing 80 to about 95% by weight of the triple salt compound, $$KHSO_4 \cdot K_2SO_4 \cdot 2KHSO_5$$

and having, in terms of $KHSO_4$, $K_2SO_4$ and $KHSO_5$, an over-all composition represented by a point within the closed curve AIJD of FIGURE 1.

7. The method comprising forming an aqueous solution at a temperature within the range 10 to 45° C., which solution has a solute composition represented by a point within the triple salt ($KHSO_4 \cdot K_2SO_4 \cdot 2KHSO_5$) field of the phase diagram at said temperature for the system $KHSO_5$—$H_2SO_4$—$K_2SO_4$—$H_2O$, and crystallizing the triple salt, $KHSO_4 \cdot K_2SO_4 \cdot 2KHSO_5$, from said solution at said temperature, said triple salt field having the shape of an irregular pentagon whose corners A, B, C, D and E, respectively, have the positions on said phase diagram defined by the following equations:

| Corner | |
|---|---|
| A | $X = 97.62 + 0.1433\,T - 0.00493\,T^2$ |
|   | $Y = 1.37 - 0.0190\,T - 0.00002\,T^2$ |
| B | $X = 17.10 + 2.279\,T - 0.01373\,T^2$ |
|   | $Y = 83.62 - 2.2919\,T - 0.02702\,T^2$ |
| C | $X = 31.08 - 0.1907\,T + 0.006627\,T^2$ |
|   | $Y = 54.42 - 0.3937\,T - 0.00184\,T^2$ |
| D | $X = 25.91 + 0.4697\,T - 0.00402\,T^2$ |
|   | $Y = 42.01 - 0.3930\,T + 0.00180\,T^2$ |
| E | $X = 89.30 - 1.894\,T + 0.03447\,T^2$ |
|   | $Y = 2.54 + 0.9647\,T - 0.01813\,T^2$ | in which equations X and Y, respectively, are the concentrations in mole percent of $KHSO_5$ and $H_2SO_4$ and T is said temperature.

8. The method of claim 7 wherein the crystallized triple salt is separated from mother liquor and the separated salt wet with mother liquor is dried.

9. The method of claim 8 wherein drying is effected at a temperature of 60 to 100° C.

10. The method comprising forming an aqueous solution at a temperature within the range of 10 to 45° C., which solution has a solute composition represented by a point within the triple salt ($KHSO_4 \cdot K_2SO_4 \cdot 2KHSO_5$) field of the phase diagram at said temperature for the system $KHSO_5$—$H_2SO_4$—$K_2SO_4$—$H_2O$, said triple salt field having the shape of an irregular pentagon whose corners A, B, C, D, and E, respectively, have the positions on said phase diagram defined by the equations therefor set forth in claim 7, said solute composition also corresponding in mole percent to from 50 to 78% $KHSO_5$, 9 to 26% $H_2SO_4$ and 12.5 to 24% $K_2SO_4$, and crystallizing the triple salt, $KHSO_4 \cdot K_2SO_4 \cdot 2KHSO_5$, from said solution at said temperature.

11. The method of claim 10 wherein the temperature is within the range 25 to 35° C.

12. The method of claim 11 wherein the triple salt is separated from mother liquor and the separated salt wet with mother liquor is dried.

13. The method of claim 12 wherein drying is effected at a temperature of from 60 to 100° C.

References Cited in the file of this patent

UNITED STATES PATENTS

| | | |
|---|---|---|
| 2,802,722 | Stephanou | Aug. 13, 1957 |
| 2,886,534 | Lake et al. | May 12, 1959 |

UNITED STATES PATENT OFFICE
CERTIFICATE OF CORRECTION

Patent No. 3,041,139            June 26, 1962

Alfred A. D'Addieco et al.

It is hereby certified that error appears in the above numbered patent requiring correction and that the said Letters Patent should read as corrected below.

Columns 9 and 10, TABLE IV, column 9, line 22 thereof, for "18.3" read -- 19.3 --.

Signed and sealed this 16th day of October 1962.

(SEAL)
Attest:

ERNEST W. SWIDER            DAVID L. LADD
Attesting Officer            Commissioner of Patents